United States Patent [19]

Clinton et al.

[11] Patent Number: 4,751,569
[45] Date of Patent: Jun. 14, 1988

[54] RECORDING BEAM CONTROL FOR COLOR IMAGE REPRODUCTION

[75] Inventors: Geoffrey D. Clinton, Abbots Langley; Paul E. Yandell, Rickmansworth, both of England

[73] Assignee: Crosfield Electronics Limited, London, England

[21] Appl. No.: 943,008

[22] Filed: Dec. 18, 1986

[30] Foreign Application Priority Data

Dec. 19, 1985 [GB] United Kingdom ................. 8531316

[51] Int. Cl.⁴ .............................................. H04N 1/46
[52] U.S. Cl. ......................................... 358/80; 358/76
[58] Field of Search ............................. 358/75, 80, 76; 430/307

[56] References Cited

U.S. PATENT DOCUMENTS

| | | | |
|---|---|---|---|
| 4,097,892 | 6/1978 | Balding | 358/80 |
| 4,340,905 | 7/1982 | Balding | 358/80 |
| 4,467,364 | 8/1984 | Konagaya | 358/280 |
| 4,689,669 | 8/1987 | Hoshino et al. | 358/80 |
| 4,691,229 | 9/1987 | Colditz et al. | 358/76 |

FOREIGN PATENT DOCUMENTS

| | | | |
|---|---|---|---|
| 144188 | 6/1985 | European Pat. Off. | 104/270 |
| 2328874 | 1/1975 | Fed. Rep. of Germany | 62/225 |
| 2016238 | 9/1979 | United Kingdom | 79/3 |

OTHER PUBLICATIONS

Pre-Press Picture Processing in the Graphic Arts Industry, Peter C. Pugsley, Dec. 1981, IEEE Transactions on Communications.

Primary Examiner—James J. Groody
Assistant Examiner—Robert M. Bauer
Attorney, Agent, or Firm—Sughrue, Mion, Zinn, Macpeak and Seas

[57] ABSTRACT

A method of generating a recording beam control function for reproducing an original colored image in which a record medium is exposed to a recording beam of radiation under the control of the control function comprises (a) generating a proof (7) from the original image; (b) generating a first recording beam control function (4) at least partly from the original image using a different reproductive process (2,3); (c) comparing the color of one or more selected areas of the proof (7A,7B) with the color of the corresponding area or areas defined by the first control function; and, (d) modifying the first control function in response to the result of the comparison step to generate a second control function (6) adapted to minimize differences in color between the proof and the reproduced image.

6 Claims, 5 Drawing Sheets

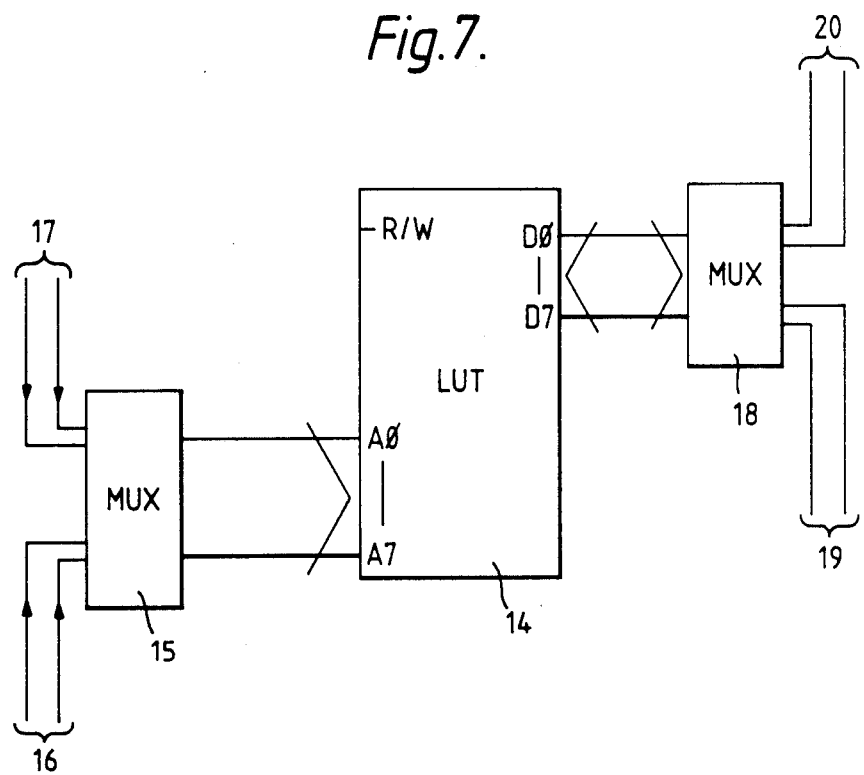

RECORDING BEAM CONTROL FOR COLOR IMAGE REPRODUCTION

FIELD OF THE INVENTION

The invention relates to a method of generating a recording beam control function for use in a method of reproducing an original image.

DESCRIPTION OF THE PRIOR ART

In the printing industry, it is common practice for a customer to supply to a printer an original image in the form of a set of film separations defining for example the cyan, magenta, yellow and black colour components. The printer prepares from these a colour proof of the image (a Cromalin), which he sends to the customer for approval. In certain printing fields, particularly Lasergravure, the printer requires the original image to be defined in a different way in the form of monochrome positives (Cronapaques or Opalins) one for each colour component. The printer digitises these, after approval of the proof by the customer, to generate a recording beam control function which is used to control the exposure of a gravure cylinder to a laser beam.

One of the problems with this method is that the resultant engraved representation of the original image does not exactly coincide in terms of colour density with the approved proof. This is primarily due to the fact that a first photographic process is involved in generating the proof, and a second different photographic process is involved in generating the digital representations. All these processes introduce errors. In the past, in the case of gravure, these errors have been compensated for by selectively reetching the record medium. This is time consuming and expensive.

One possible solution would be to display the digitised colour separations on a monitor and modify them visually to coincide with the approved proof. However this is expensive and the monitor may not generate an accurate reproduction of the digitised separations.

SUMMARY OF THE INVENTION

In accordance with the present invention, we provide a method of generating a recording beam control function for use in a method of reproducing an original coloured image in which a record medium is exposed to a recording beam of radiation under the control of the control function, the method comprising (1) generating a proof from the original image;

(2) generating a first recording beam control function at least partly from the original image using a second reproductive process different from the first reproductive process;

(3) comparing the colour of one or more selected areas of the proof with the colour of the corresponding area or areas defined by the first control function; and, (4) modifying the first control function in response to the result of the comparison step to generate a second control function adapted to minimise differences in colour between the proof and the reproduced image.

In this method, a recording beam is controlled in accordance with a control function which controls some characteristic of the recording beam. In the case of gravure, this characteristic will be the time for which a pixel is exposed by the recording beam.

Typically, the "original image" will be in the form of a plurality of film separations, typically representing the cyan, magenta, yellow (and black) colour component content of pixels of the image.

Preferably, the first reproductive process comprises a first photographic process for generating a positive, coloured proof from the film separations. The proof may comprise a Cromalin which is produced by laying each film separation in turn on a laminate having a light sensitive coating and exposing this to a light beam. The exposed, hard parts of the laminate are then provided with an appropriately coloured powder. The laminate is recoated prior to each exposure.

Preferably, the second reproductive process comprises a second photographic process for generating monochrome positives from the film separations, and a digitising process for generating a digital representation of each monochrome positive.

Preferably, the comparison step comprises comparing directly or indirectly the colour densities of the one or more selected areas of the proof with the colour densities of the corresponding area or areas defined by the control function.

Typically, the control functions are defined by data representing the colour content, such as colour density, of pixels of the original coloured image and a control characteristic for converting the colour content data to a form suitable for controlling the recording beam. In general, the colour content data will comprise data for a plurality of colour components in which case there will be a separate control characteristic for each colour component.

Preferably, the control characteristic or characteristics is modified in step 4. However, in some examples, the colour data may instead be modified while the control characteristic or characteristics is left unchanged.

Conveniently, the or each control characteristic comprises a look-up table.

It should be understood that in general steps 1 and 2 will be separated by a significant interval in which the proof is approved after a visual inspection. Typically, the proof will be generated by screening the original image and reproducing the screened image as a positive print. This print will be typically of the same size as the finally reproduced image.

BRIEF DESCRIPTION OF THE DRAWINGS

An example of a method in accordance with the invention will now be described with reference to the accompanying drawings, in which:

FIG. 7 is a block diagram of a RAM defining a look-up table.

DETAILED DESCRIPTION OF AN EMBODIMENT

Initially, a customer presents a set of continuous tone (or half tone) film separations to the printer defining an original image in terms of its colour components. From these separations the printer generates, via a conventional screening process and a subsequent photographic process, a Cromalin proof. This reproduction process effectively applies a process variable 1 (FIG. 1) to the continuous tone film separations. The Cromalin is typically a positive in the form of a white base reflection copy which is presented to the customer for approval.

At the same time or after customer approval if the original is still available, a set of black and white positives are generated from the continuous tone film separations, one for each separation. This process applies a second process variable 2 (FIG. 1) in the form of a second photographic process, different from the process variable 1, to the continuous tone film separations to generate three of four black and white Cronapaques (or Opalins). These are required as the basis for conventional lasergravure systems. The three or four balck and white positives representing continuous tone separations for, for example, cyan, magenta, yellow, and black are then scanned by a conventional electronic scanner into a digital form defining the colour component densities for each pixel which is stored on a disc. This scanning process is represented by a line 3 in FIG. 1.

The colour density values stored on disc are then used as part of a control function to control a laser beam or electron beam which impinges on a record medium such as a plastic coated gravure cylinder to engrave the final colour separations as in our Lasergravure apparatus. Part of the processes represented by the lines 1, 2 in FIG. 1 reduces the variation in colour density for each colour component to a range lying between 0 and 255. In the subsequent gravure process, as relative scanning movement takes place between the exposing beam and the record medium, a computer accesses the relevant colour component density data for the pixel being exposed, from the disc store. For example, this data might contain the value 100 for the cyan separation. This data is used to address a look-up table defining a control characteristic for each colour component forming another part of the control function which, in it simplest form, defines a linear relationship between the stored values and the degree of exposure of the record medium. This is illustrated by a line 4 in FIG. 1.

If the process variables 1, 2 were identical then the value 100 stored in the disc would exactly correspond with the colour density of an exactly similar coloured pixel of the corresponding Cromalin. However, in general this will not be the case and for example an engraved pixel produced in response to the value of 100 stored on disk may result in a final image which is too dark. In other words, the record medium is exposed for too long.

Figure 1:
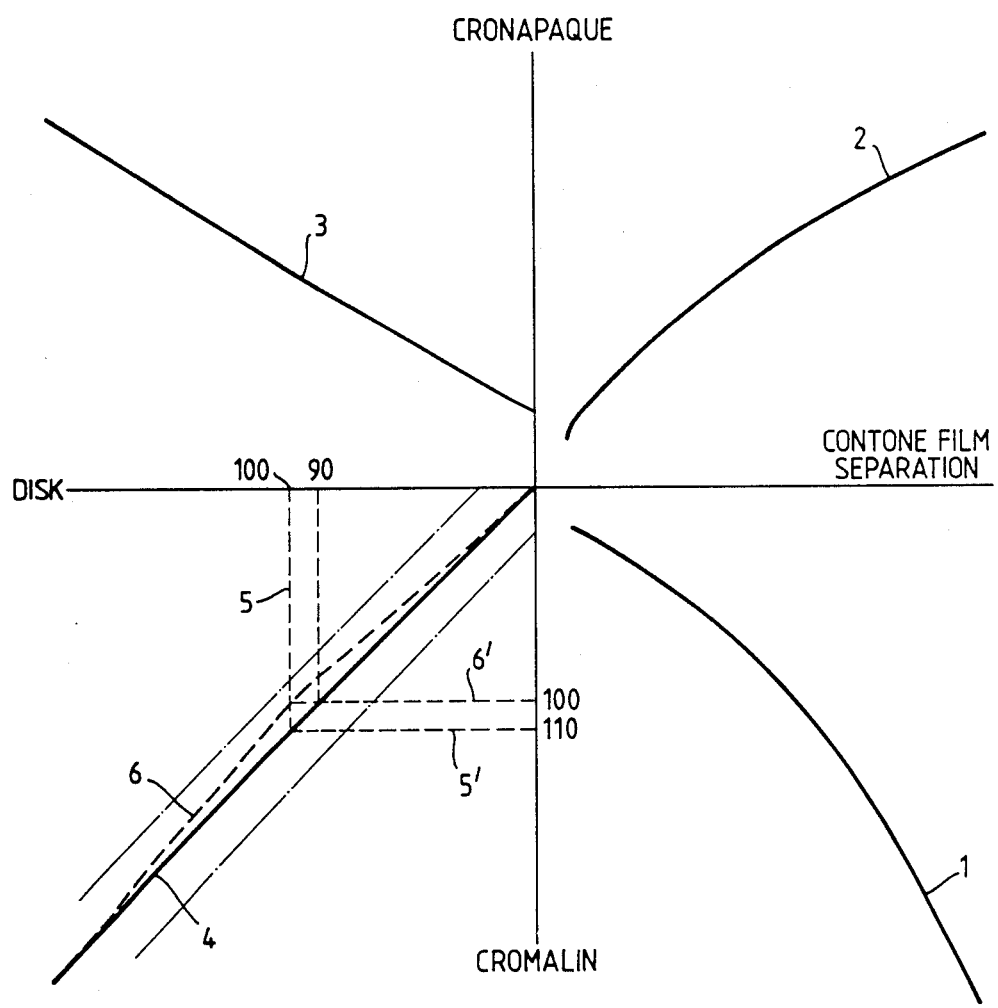
FIG. 1 illustrates the method graphically.

This may be understood from FIG. 1 by following the dashed lines 5, 5' which indicate that the cyan component of a pixel engraved in accordance with the cronopaque data (100) stored for the colour separation corresponds to a different value (110) for the cyan colour density as defined by the Cromalin. The purpose of the invention is to correct the form of the line 4 so that where a Cromalin pixel has for example a cyan colour density of 100, the exposing beam is controlled to engrave the record medium correctly with that value. In the example illustrated, it is therefore necessary to modify the line 4 as indicated by a dashed line 6 so that the engraved pixel corresponds with the corresponding Cromalin pixel (lines 5, 6').

In general, various areas of the Cromalin each of a size in the order of 1 mm$^2$ will be compared with the corresponding areas on disc so that the line 4 can be modified at a number of positions to provide an accurate control characteristic.

FIGS. 2 to 5 illustrate schematically part of the apparatus for carrying out the method. It is assumed that the Cromalin has been photographically produced printed and that the Cronapaque separations have been scanned onto a disc store accessible by a microcomputer.

Figure 2:
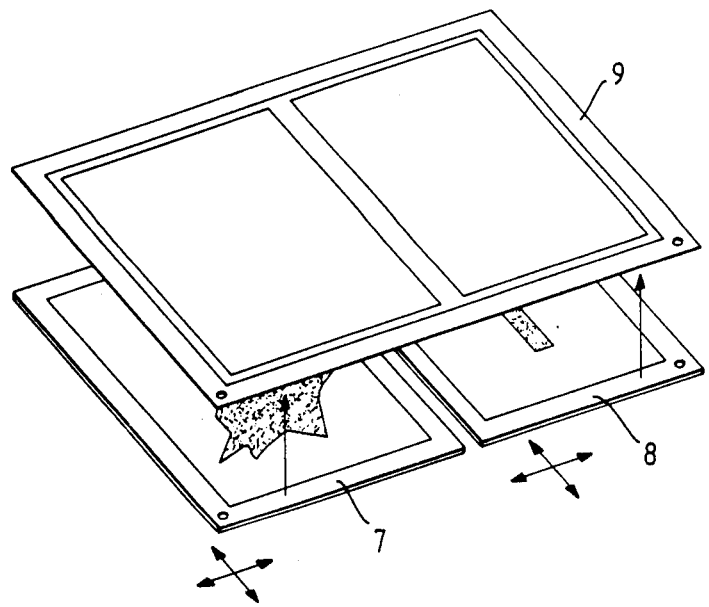
FIGS. 2 to 5 illustrate schematically part of the apparatus for carrying out the method.
Figure 3:
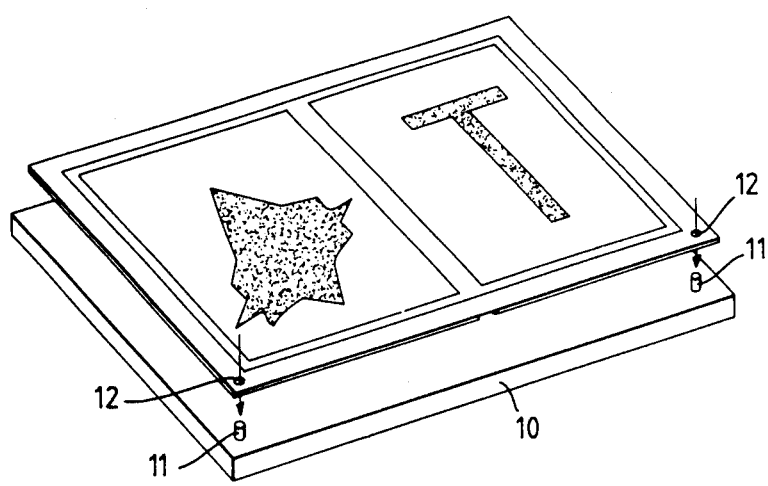

In this example, as shown in FIG. 2, a pair of Cromalins 7, 8 are to be printed side by side. The Cromalins 7, 8 are fixed to the underside of a layout sheet 9 with a low tack adhesive. The layout sheet 9 is used so that the Cromalins 7, 8 can be accurately registered.

Figure 4:
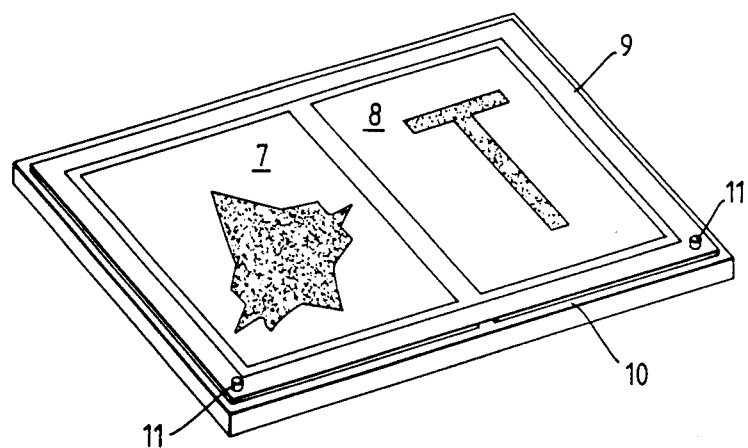

The assembly of Cromalins 7, 8 and layout sheet 9 is then positioned on a conventional digitising table 10 (FIG. 3) having a pair of upstanding pins 11 which locate in corresponding apertures 12 in the layout sheet 9. This arrangement is illustrated in FIG. 4. A suitable digitising table is that included in our DATRAX 760C system.

Figure 5:
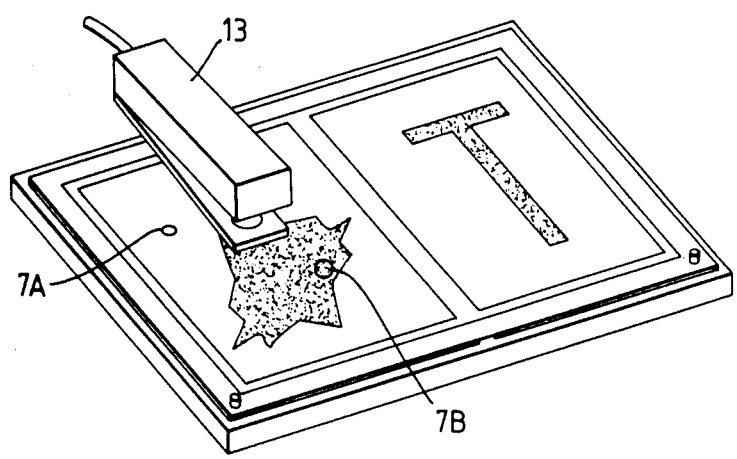

A conventional densitometer 13 (FIG. 5) is then placed over each Cromalin 7, 8 at a number of positions (eg. ten) two of which 7A, 7B are shown in FIG. 5. In general, these positions will correspond to areas of general highlight, general midtone, and general shadow. The densitometer 13 can detect in each position, corresponding to a number of adjacent pixels, the average colour density in that position for each colour component. These colour component values are fed to the microcomputer together with information relating to the X, Y coordinates of the area being scanned. Thus, in one position, the densitometer 13 might provide colour density components of cyan: 100, magenta: 50, and yellow: 50. In general, a black separation signal will be calculated in addition from the densitometer values.

Figure 6:
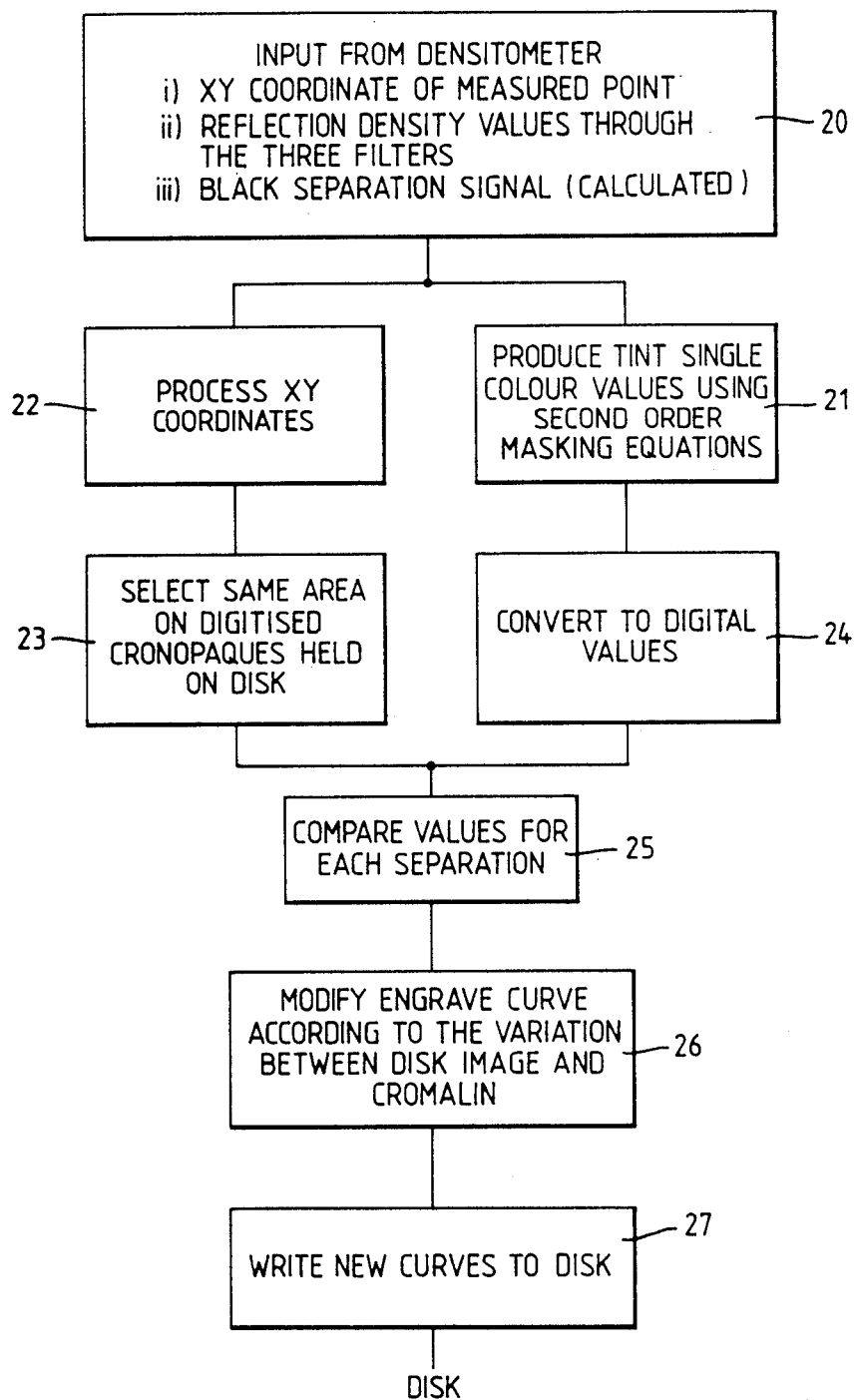
FIG. 6 is a flow diagram of the processing steps of the method.

The steps carried out by the microcomputer are illustrated in FIG. 6. The incoming colour density values and the black separation signal (step 20) are processed to produce tint signal colour values (step 21) using second order masking equations (due to the fact that each colour component is masked by the others) and these colour values are converted to digital values (step 24). At the same time (step 22), the X, Y coordinates of the area of the Cromalin being measured are processed to enable the same area of the digitised Cronapaque to be accessed (step 23). For example, the corresponding values (after averaging) for the area measured by the densitometer, stored on disc, might be cyan: 110, magenta: 60, and yellow: 60.

These values are then compared for each colour component (or separation) to determine any differences (step 25).

Previously, the control characteristic or curve in the form of look-up table will have been stored for each colour separation. At this stage, the previously stored look-up tables are modified in accordance with the results of the comparisons carried out (step 26). This modification inserts into the look-up tables new control values corresponding to the areas which have been measured by the densitometer 13. In addition, parts of the look-up tables defining intermediate portions of the control curves will be modified automatically by interpolation to provide a gradual change between adjacent pairs of determined modifications.

These new look-up tables are then used to convert the colour density values stored on disc (representing the Cronapaques) to control values for controlling an exposing laser beam in a conventional manner (step 27).

An example of hardware for storing and modifying the look-up tables is illustrated in FIG. 7. Each look-up table is stored in random access memory (RAM) 14 having dimensions of 256×8. Each of the 256 addresses is selected using address lines from a multiplexer 15 which is controlled either from data lines 16 or control lines 17. Data from the RAM 14 is fed to a bidirectional multiplexor 18 connected to the data lines of the RAM. During normal operation, after the look-up table has been defined, data representing a Cronapaque pixel density is fed along the lines 16 to a multiplexer 15 and is used to address the RAM 14. The contents of that address are then output along the data lines to the multiplexor 18 and then along the output lines 19 to control an exposing beam in the conventional way described above.

The contents of the RAM 14 can be modified during the prior stage described above. During this stage, the RAM 14 is controlled in a write mode and each address is successively selected by signals applied along the control lines 17. As each address is selected, new density data is supplied along lines 20 to the bidirectional multiplexor 18 which feeds that data into the RAM 14 via the data lines.

It will be appreciated that the data fed along the lines 20 will have been determined using the densitometer technique described above in which exact density values have been determined for certain Cronapaque densities while the others have been interpolated using a microcomputer.

We claim:

1. A method of generating a recording beam control function for use in a method of reproducing an original coloured image in which a record medium is exposed to said recording beam of radiation under said control of said control function, said method comprising:
   (1) generating a proof from said original image using a first reproductive process;
   (2) generating a first recording beam control function at least partly from said original image using a second reproductive process different from said first reproductive process;
   (3) comparing the colour of at least one selected area of the proof with the colour of the corresponding area or areas defined by said first control function; and,
   (4) modifying said first control function in response to the result of said comparison step to generate a second control function adapted to minimize differences in colour between said proof and said reproduced image, wherein said original image is defined by a plurality of film separations, and said first reproductive process comprises a first photographic process for generating a positive, coloured proof from said film separations.

2. A method according to claim 1, wherein said second reproductive process comprises a second photographic process for generating monochrome positives from said film separations, and a digitizing process for generating a digital representation of each monochrome positive.

3. A method according to claim 2, wherein said digitizing process comprises scanning each of said monochrome positives and generating and storing for each pixel a digital representation of the corresponding colour component content of said pixel.

4. A method according to claim 3, wherein said control functions are defined by data representing the colour content of pixels defining said original coloured image and a control characteristic for converting said colour content data to a form suitable for controlling said recording beam.

5. A method according to claim 4, wherein said control characteristic is modified in step 4.

6. A method according to claim 4, wherein the control characteristic is stored in a look-up table.

* * * * *